July 31, 1945.  N. URQUHART  2,380,560
PERMANENT MAGNET
Filed June 11, 1942
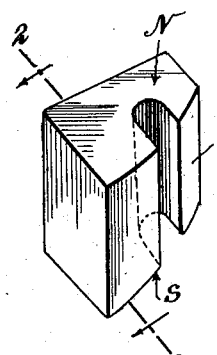
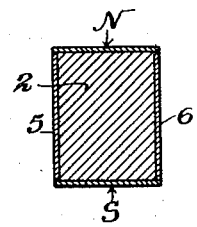
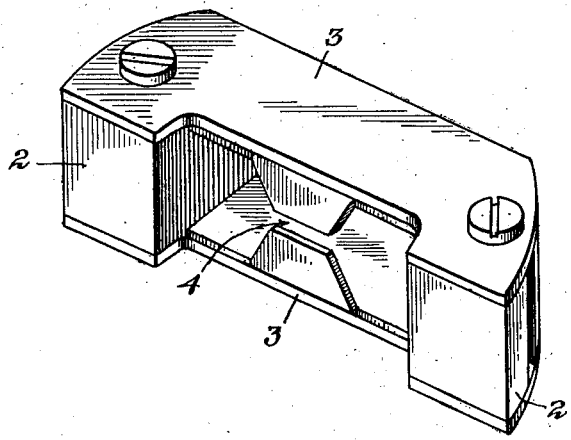
WITNESSES
INVENTOR
Noel Urquhart
BY
ATTORNEYS Patented July 31, 1945

2,380,560

UNITED STATES PATENT OFFICE 2,380,560

PERMANENT MAGNET

Noel Urquhart, Stewart Manor, N. Y., assignor to Control Instrument Company, Inc., Brooklyn, N. Y., a corporation of New York Application June 11, 1942, Serial No. 446,601

4 Claims. (Cl. 175—21)

The present invention relates to an improved permanent magnet in which a protective coating is applied thereto to prevent corrosion and chipping under shock.

Previously such a protective coating, if completely covering the magnets, has in one way or another interfered with the quality and performance of the finished product.

It is an object of the invention to completely cover a permanent magnet with a protective coating, while causing no impairment of its magnetic performance.

If a non-magnetic material is used to plate a permanent magnet over its entire surface, so as to completely prevent corrosion or chipping, the magnetic flux available from such a magnet must necessarily pass through the plating. As permanent magnets are generally used in assemblies where butt joints are maintained with adjoining surfaces of magnetizable material, this introduces an air gap which reduces the effectiveness of the magnet. The non-magnetic plating may be removed at these areas of contact, but this leaves the magnetic material free to corrode at these areas or chip at the edges.

If plating of permanent magnets is done with a non-corrosive magnetic material such as nickel, the magnetic flux at the butt points will readily pass through the nickel plate. However, this advantage is partly offset by the fact that magnetic flux leakage is increased by the use of the magnetic nickel plate.

According to the present invention, it is intended to provide a permanent magnet with complete protection against corrosion or chipping, without interfering with its performance as a magnet. To this end, the magnet is plated or coated with a non-corrosive, non-magnetic material on those surfaces which are not in contact with adjoining magnetic surfaces, and plating with a non-corrosive magnetic material on those surfaces, such as the pole faces, which are in contact with adjoining magnetic surfaces, such as the pole-pieces.

In the accompanying drawing:

Fig. 1 represents a view in perspective of a permanent magnet embodying my invention;

Fig. 2 is a view in section taken on the dotted lines 2—2 of Fig. 1, showing the distribution of the magnetic and non-magnetic coatings on the surface of the magnet; and Fig. 3 illustrates the manner in which the magnets of Fig. 1 is employed in a magnetic structure.

In Fig. 1, the magnetic pole-faces of the permanent magnet 2 are indicated as the upper end N and the lower end S, and in Fig. 2, the poles of the magnet are similarly indicated. Said faces are plated, before attachment of pole-pieces 3 thereto, as in Fig. 3, with a non corrosive magnetic material such as nickel, cobalt, or pure iron which is fairly resistant to corrosion. In this connection where the iron is deposited by electrolytic process, it will necessarily be in pure form. The magnetic flux will therefore pass freely through the ends of magnet 2 to the pole pieces 3. The magnetic flux can then be efficiently concentrated in the air gap 4. The sides of the magnet, indicated at 5 and 6 in Fig. 2, are protected from corrosion by a non-corrosive, non-magnetic coating, which may consist either of a metallic plating, such as cadmium and copper, or any suitable form of paint, varnish, etc., or a combination of the two. It is evident that a magnetic coating on these surfaces would allow an appreciable amount of leakage flux to flow between the magnetic poles N and S.

Although the magnet 2 is coated with two separate protective coatings, applied to different surfaces of the magnet, such coatings can be simply and inexpensively applied in quantity production of permanent magnets.

It is customary in the production of permanent magnets to cast, forge or otherwise form the material to a rough shape and then to accurately grind the contacting magnetic surfaces to the required dimensions. The dimensions of the other surfaces are often sufficiently accurate to require no additional shaping beyond the initial forming operation.

The method proposed for the inexpensive manufacture of coated magnets in quantity, is to form the magnets to their final shape, with the exception of those surfaces which will contact with adjoining magnetic structures such as the pole-pieces 3. The non-contacting sides 5 and 6 of the magnets may be plated, by an electrolytic process, with a non-corrosive, non-magnetic material such as copper or cadmium. A light coat of any known and suitable insulating paint or varnish may be then applied to said surfaces. The contacting surfaces or pole-faces of the magnets are then ground to final dimensions, exposing clean surfaces, which can be electrolytically plated with a non-corrosive magnetic material such as nickel so that a bond is formed between the latter and said pole-faces. Finally, the pole-pieces 3 are secured in position with their ends in contact with the plated pole-faces. The insulating paint or varnish, if used to cover the sides of the magnet bodies, will of course prevent deposition of nickel on any other parts of the magnets.

This method of applying a protective coating to permanent magnets is therefore readily adaptable to ordinary production methods and involves very little additional expense.

The invention is of course not to be limited to the particular materials specified, or to the specific methods described in applying them. The non-magnetic plating (copper or cadmium) may be omitted and the insulating paint or varnish used alone as a protective coating. Other changes may also be made, as for example, coating the contacting surfaces with a paint that contains magnetic material in suspension. Various other methods may be employed to apply the non-magnetic and the magnetic coatings. The scope of the invention is therefore not to be limited except as indicated by the following claims:

I claim:

1. A permanent magnet structure adapted for use with pole pieces, said structure comprising a body made of magnetic material and having sides and pole faces, a non-corrosive, non-magnetic coating for the sides of said body, and a non-corrosive magnetic covering for each of said pole faces forming a permanent part thereof and adapted for contact with said pole pieces.

2. A permanent magnet as set forth in claim 1 in which the magnetic non-corrosive covering comprises a metal selected from the group consisting of nickel, cobalt and pure iron.

3. A permanent magnet as set forth in claim 1 in which the non-magnetic non-corrosive covering consists of a metal selected from the group consisting of copper and cadmium.

4. A permanent magnet as set forth in claim 1 in which the non-magnetic non-corrosive coating consists of a material selected from the group consisting of insulating paints, varnishes and lacquers.

NOEL URQUHART.